Patented July 22, 1952

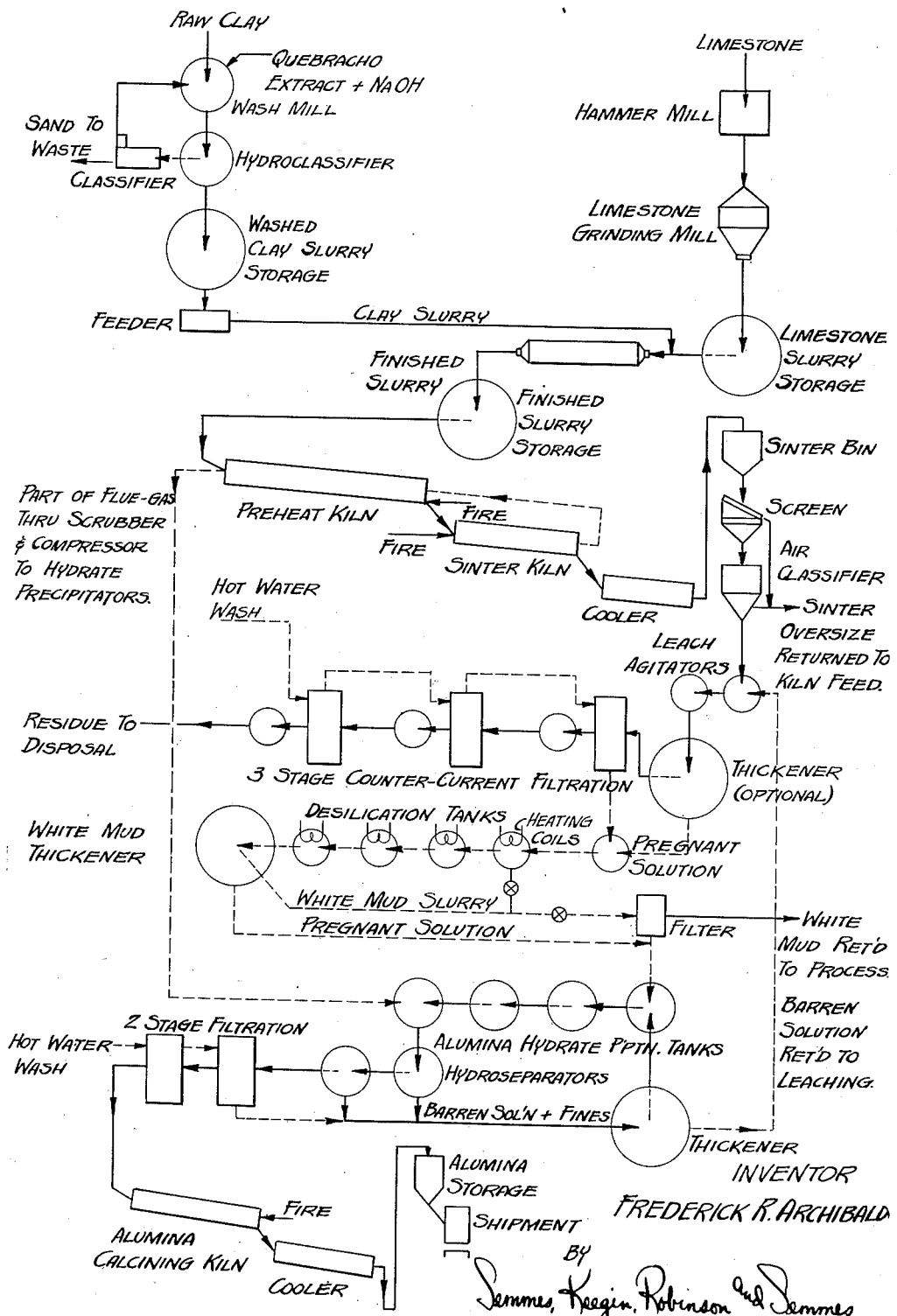

2,604,379

UNITED STATES PATENT OFFICE 2,604,379

ALUMINA EXTRACTION

Frederick Ratcliffe Archibald, St. George, S. C., assignor to Ancor Corporation, New York, N. Y., a corporation of Delaware Application January 23, 1947, Serial No. 723,692

9 Claims. (Cl. 23—143)

The present invention relates to the treatment of siliceous aluminous materials for the separation and recovery of alumina, and has particular reference to improvements in methods of treating siliceous aluminous clays to extract alumina having a low silica content.

A present method of treating siliceous aluminous materials such as ores, clays and the like, embodies the combination of finely ground aluminum containing material with limestone, pelletizing the mixture, sintering the pellets, leaching the sintered pellets, desilicating the aluminate solution, and separating the alumina from the solution by carbonation or autoprecipitation. The leaching solution preferably is recirculated through the system after removal of alumina for purposes of economy.

The present invention embodies improvements in this general method of treating siliceous aluminous materials, particularly aluminous clays. Aluminous clays are generally characterized by a content of fine silica sand, mostly finer than 325 mesh, and varying in amount according to source. The siliceous materials physically present are preferably separated from the clay, to facilitate further treatment of the clay to obtain alumina meeting commercial standards for metal manufacture. This is accomplished at the present time by "washing" the siliceous aluminous material or otherwise classifying out the sand. The washing of aluminous clays, however, is complicated by the fact that clays are difficult to disperse in a liquid carrier for washing purposes, and once accomplished, settling out of the siliceous material is inhibited by the tendency of the clay slurry to gel or set.

A further difficulty in present methods of extraction of alumina resides in the tendency of a portion of the aluminous material-limestone sinter to remain as oversize particles through imperfect decrepitation, due primarily to failure of $\beta$ dicalcium silicate to invert to the $\gamma$ form. The failure may be due to imperfection in composition or firing of the mixture. The oversize sinter particles resist subsequent treatment and provide poor alumina yields, as well as clogging the treatment apparatus with accumulations of cement-like solids. The larger sinter particles tend to agglomerate smaller particles to form nodules, which resist thorough wetting necessary in subsequent treatment.

Desilication of the siliceous aluminous material presently embodies the use of high pressure apparatus, wherein the materials are treated at temperatures above the boiling point. Apparatus employed in such procedure is expensive and the methods involve the loss of large amounts of potential alumina yield in order to effect satisfactory silica elimination.

It is an object of the present invention to provide an economical method of extracting alumina from siliceous aluminous materials, which is readily adaptable to commercial scale operations and which obviates the aforementioned disadvantages of present alumina extraction methods.

Another object is to provide an improved method of treating siliceous aluminous clays for the production of a substantially silica free alumina product.

Still another object of the invention is to provide a method of treating siliceous aluminous materials such as aluminous clays to extract alumina, wherein the material is pre-treated to effect maximum removal of siliceous materials in the physical state, prior to chemical treatment of the materials.

A still further object is to provide a method of extracting alumina from siliceous aluminous materials, particularly clays, in which the material is ground, mixed with limestone, sintered, and the sintered particles classified according to size for further treatment, oversize sinter particles being returned for further sintering treatment.

It is also an object of this invention to provide a method of extracting alumina from siliceous aluminous materials wherein the material is ground, mixed with limestone, pelletized, sintered and leached, the leaching operation being accomplished so as to achieve an immediate, fine dispersion of sinter particles in the leaching solution, without the formation of slowly reacting nodules of sinter.

This invention has as another object to provide a method of preparing siliceous aluminous materials for treatment to effect maximum extraction of alumina, wherein the said materials are reacted with limestone, sintered, the sintered particles classified according to size, and the sized particles dispersed immediately and thoroughly in a leaching solution to effect maximum reaction.

Yet another object is to provide an improved, economical method of desilicating alkali aluminate solutions wherein the solutions are processed at normal atmospheric pressures and below boiling temperatures, in the presence of a reaction accelerator obtained as a byproduct of the method.

Other objects and advantages of the invention will be apparent from the following detailed description thereof and the accompanying drawing wherein is illustrated a flow diagram of the process of the invention.

In its broadest application, the invention includes the treatment of any siliceous aluminous material to effect the extraction of alumina providing a product free from silica to a degree meeting the exacting commercial requirements of alumina employed in metal manufacture. The principles of the invention are particularly applicable to the treatment of siliceous aluminous clays, characterized by the physical presence of finely divided silica, as well as silica compounds in chemical combination with the aluminum content of the clay. In the following description reference will be made to the treatment of siliceous aluminous clays in applying the principles of the invention in actual practice. It is to be understood that this reference to a particular starting material is not to be regarded as limitative of the scope of the invention, which is defined in the appended claims.

In carrying out the invention, as indicated in the flow chart, the clay starting material is washed or blunged to effect maximum removal of fine silica sand particles physically associated with the clay. The siliceous sand may be very fine-grained, e. g. mostly finer than 325 mesh. Settling and removal of such sand demands exceptionally complete dispersion or defloculation of the clay particles. The usual phosphate deflocculents for clay washing cannot be used since the presence of phosphorus in sinter made from the clay would inhibit decrepitation. It has been found that blunging of the clay is most effectively carried out in an alkaline liquid washing medium in the presence of a deflocculating or dispersing agent containing tannic acid. The materials are charged in a suitable wash mill and the mixture agitated to effect maximum dispersion of the clay, forming a slurry.

Sand classification or settling is best accomplished by initially vigorously agitating the slurry to effect proper mixture and dispersion of the ingredients. The slurry is then allowed to stand with only slight agitation, sufficient to initiate a shearing action in the slurry to inhibit gelation. It is preferred to employ a shallow draught classifier for this purpose, circulating the slurry by pumping slurry from a point intermediate the depth or the classifier to the surface. This inhibits the normal tendency of the slurry to hydrate of gel upon standing, which retards downward movement of the sand particles.

The alkali employed may comprise any alkali metal hydroxide such as NaOH. A cheap and readily available source of tannic acid is found in quebracho extract, a natural bark product which contains approximately 35% tannin.

The proportions of materials employed in the clay prewash preferably comprise six pounds of sodium hydroxide, well mixed with four pounds of quebracho containing 35% tannin, per dry ton of clay. This is the most effective and economical combination of these reagents and is effective with clays varying widely in percentage and fineness of sand content.

It is essential that clay-limestone slurry for kiln feed contains a minimum of water. The required clay:limestone ratio demands that the clay slurry contains 40-45% or better, clay solids. Clay cannot be washed at lower pulp density and then thickened up to 40-45% solids. Therefore, it is a real accomplishment and convenience to find the alkali hydroxide:tannin mixture deflocculent that permits highly efficient dispersion of clay particles in a slurry containing up to 45% solids and subsequent removal of the finest sand. Moreover this deflocculent may be used to disperse a wide variety of clays and at wide limits of pulp density.

The necessary quantity of deflocculent for good clay dispersion increases rapidly as the proportion of clay slurry solids to liquid is increased. The specified deflocculating mixture is best employed with clay slurry containing approximately 40% solids. Slurries containing less than 40% solids of course require less than the specified amount of alkali-deflocculent mixture for good sand removal or a lower ratio of tannin to alkali hydroxide may be used, and for higher than 40% solids, efficient dispersion may be attained with increased expenditure of deflocculent or a higher ratio of tannin to alkali hydroxide. As indicated hereinbefore, the preferred deflocculent mixture for washing clay at about 40% solids is 6 parts by weight of alkali caustic to 4 parts by weight of tannin or specifically 6 parts sodium hydroxide:4 parts quebracho. As a general principle, a low slurry viscosity is critically important for accomplishing proper sand settling. The viscosity of a well dispersed clay slurry preferably should not exceed 1.05, compared with water as 1.0, using a Marriott viscosimeter. Settling of the finest silica sand particles is substantially completed in four hours' time.

Aluminous clay dispersed and washed in accordance with the prescribed method is free from siliceous materials in physical form, and when combined with limestone, sinters with excellent results. The sinter particles decrepitate faster to fine particle form, which permits of a greater extraction of alumina than is accomplished with treatment of unwashed clay.

The washed clay slurry is mixed with a crushed, high calcium limestone slurry. The proportion of clay to limestone will vary in forming the mixture, depending upon the chemically combined silica content, the alumina content, the amount of alkali or alkali forming materials present in the clay, and the available lime in the limestone.

The leaching solution, described in detail hereinafter, comprises an aqueous solution of an alkali metal carbonate.

The following example is indicative of constituent proportion of kaolinite, a siliceous aluminous clay, advantageously used as a starting material, and includes the proportions of kaolinite clay and limestone:

|  | Kaolin | Limestone |
|---|---|---|
| $Al_2O_3$ | 38.97 |  |
| $SiO_2$ | 43.23 | 2.0 |
| $Na_2O$ | 0.15 |  |
| $K_2O$ | 0.09 |  |
| $CaCO_3$ |  | 93.0 |
| Net $CaCO_3$ |  | 86.3 |

In this case, each 100 tons of clay-limestone mixture should contain 30 tons of clay and 70 tons of limestone.

Sintering of the clay-limestone mixture is best accomplished if the mixture is first formed in the shape of small pellets, before sintering. The pelletizing and sintering of the mixture preferably is carried out in the manner disclosed in copending application Serial No. 459,587, filed September 24, 1942, now Patent No. 2,420,852. It has been found that substantial economies are effected if the pelletized clay-limestone mixture is preheated prior to passage into the sintering furnace, passing exhaust gases from the sintering furnace countercurrent to the passage of the pelletized mixture through the preheating kiln, extracting residual heat therefrom. Heat additional to that recovered from the sintering furnace may be necessary and applied directly to the preheating kiln. The exhaust gases discharged from the preheating furnace preferably are scrubbed and compressed, providing a convenient source of carbon dioxide for use in precipitation of aluminum hydrate, to be described.

After passage from the sintering kiln, the sintered pellets of clay-limestone mixture are cooled. When cooling is complete, the fully sintered pellets will have spontaneously disintegrated or decrepitated to a fine powder, due to chemical reactions occurring during the sintering step. However, it has been found to be of great advantage in carrying out subsequent steps of the extraction process, to effect a separation of sintered particles in accordance with a preferred size classification. Accordingly, the sintered particles are first screened to remove partially sintered lumps formed during the sintering step for example of approximately a 20-mesh size. The screened particles are then passed through an air classifier, which permits of a particle size separation in the vicinity of 325 mesh and smaller. Oversized sintered particles resulting from the screening operation and the air classification separation are returned to the sinter kiln and reprocessed, in order to effect a more complete disintegration or decrepitation. In this manner, a sinter particle size in the order of from two to five microns is achieved. One of the advantages inherent in removal of the over 325 mesh sinter particles, resides in the prevention of settling out of the coarser particles in the apparatus employed in leaching and subsequent operation. More important, the oversized particles yield much less alumina end product, than the preferred, more finely divided particles.

A sample of the decrepitated sinter was screened on a 325-mesh sieve. The coarse fraction retained on the sieve was labeled A and the fine fraction passing was labeled B. These samples were subjected to petrographic and X-ray examination and it was found that Sample B was composed essentially of $C_5A_3(5CaO.3Al_2O_3)$ and gamma $C_2S(2CaO.SiO_2)$ particles all minus 5 microns in diameter. Sample A was composed of abundant grains of uninverted beta $$C_2S(2CaO.SiO_2)$$

aggregate up to 60 microns diameter, some $C_5A_3$, gamma $C_2S(2CaO.SiO_2)$ and relatively large grains of Gehlenite. Since particles retained by a 325-mesh sieve are 44 microns in diameter it is clear that Sample A particles ranged from 44 to 60 microns and Sample B particles ranged 5 to 0 microns in diameter. This is a unique break in sizing, since powdered materials are normally composed of particles representing some of all the micron sizes. In view of this break, it is obvious that any procedure that will separate 5 micron particles from larger particles may be used. The sizing need not be on a 325 mesh basis but may be smaller or slightly larger.

The classified sintered particles are then subjected to a leaching treatment to dissolve aluminate compounds present and permit of separation from the leaching pulp or residues, comprising essentially insoluble silicates. The leaching is carried out for a period of time varying from 20 to 60 minutes, preferably 40 minutes, at a temperature preferably in the vicinity of 145° F. At above this temperature, the dissolution of silica in the leaching solution is increased and below this temperature the extraction of alumina is decreased. The leaching liquor may comprise an aqueous solution of $Na_2CO_3$ or other alkali metal carbonate.

In carrying out the leaching operation, it is essential to secure an immediate and complete dispersion of the fine sinter particles in the alkali solution, in order to achieve best results in terms of solution of aluminates. To this end, it is important that the leaching solution be agitated vigorously as the sintered particles are introduced. Failure to take this precaution results in the formation of small agglomerations or nodules of sinter particles which wet readily on the surface but remain dry inside. These nodules resist the leaching operation, and are very difficult to break up, even with subsequent agitation. This results in very poor extraction of alumina, as well as contributing to clogging of the apparatus by the accumulation of cemented deposits. With these considerations in mind, the importance of eliminating the over 325 mesh sinter particle fraction, before initiating the leaching operation, becomes apparent.

Once the initial vigorous agitation is accomplished to the end of dispersing completely the sinter particles, leaching of the sinter to effect solution of the aluminates proceeds, with normal agitation sufficient to prevent settling or cementing of solids. This is accomplished in a period of approximately one hour. The two stage agitation of the leaching mixture maintains the mixture in condition for subsequent filtration to separate the dicalcium silicate residue, from the dissolved aluminates. In general, agitation of the decrepitated and sized sinter is effected for a period of time and in a manner such as to prevent the formation of pellets and to completely eliminate the presence of compounds or materials having setting properties.

For purposes of economy, it is preferred to employ for leaching operation a solution obtained from a previous leaching cycle, impoverished of alumina content. It is important however that the impoverished leaching solution be adjusted as to required alkali content, before reuse. To effect maximum recovery of alumina and achieve minimum dissolution of silica from the leaching solution, the free alkali and total alkali carbonate content of the leaching solution should be controlled carefully, and correlated with the time of extraction treatment. Normally, the free alkali hydroxide content is augmented through causticizing of sodium carbonate by calcium aluminates of greater than equimolar proportion of lime. The free hydroxides are not effective in dissolving alumina from the calcium aluminates present in the sinter, and the presence of an excess reduces the efficiency of the carbonates. Accordingly, it is preferred that free alkali be present in amounts of 15 to 30 grams per liter of solution, with 100 to 150 grams per liter of total soda expressed in $Na_2CO_3$. The free alkali concentration can be regulated by introduction of compressed flue gas ($CO_2$) into the leach pulp as required. By leaching the decrepitated sinter, the solution is brought to an alumina concentration of approximately 40 to 60 grams of $Al_2O_3$ for each liter of solution, and from about 0.5 g. p. l. to 1.5 g. p. l. $SiO_2$. The higher total alkali concentration is conducive to better extraction of alumina; the lower enhances desilication somewhat. Solutions containing the upper limit of total alkali tend to greater difficulty in mechanical handling and to higher mechanical soda losses while those containing the lower limit may also contain a lower concentration of $Al_2O_3$ after each leaching cycle. It is preferred that the $Al_2O_3$ concentration be as high as possible since the $SiO_2$ value in the product is related directly to it. For example, if the desilicated pregnant solution contains 50 g. p. l. Al₂O₃ and 0.06 g. p. l. SiO₂, and if not more than 80% or 40 g. p. l. of Al₂O₃ is precipitated, not more than 33% of the SiO₂ will be precipitated with it; therefore, the product Al₂O₃ will contain only $$\frac{.02}{40} \times 100 = 0.05\% \text{ SiO}_2$$

However, if the treated pregnant solution contains only 40 g. p. l. Al₂O₃ and 0.06 g. p. l. SiO₂, under the same precipitation conditions the product would contain $$\frac{.02}{32} \times 100 = 0.06\% \text{ SiO}_2$$

the solution is greatly reduced by treatment thereof for four hours. Further reduction of the silica content can be accomplished by continuing the agitation and heat treatment up to 20 hours. The time of agitation depends in large degree upon the quantity of sodium aluminum silicate compound or white mud present in the liquor. While 4% of solids is satisfactory, greater amounts of solids proportionally shorten the time of treatment required. A solution of the above composition has a boiling point of approximately 215° F.

Results of various treatments of several samples of pregnant solutions are given in the following table:

|  | Untreated Pregnant Solution | | | | | | | Treated Solutions | |
| --- | --- | --- | --- | --- | --- | --- | --- | --- | --- |
|  | Total Alkali g. p. l. Na₂CO₃ | Free Alkali g. p. l. NaOH | Al₂O₃ g. p. l. | SiO₂ g. p. l. | White Mud g. p. l. | Temp. °F. | Time Hrs. | Al₂O₃ Pptn. Per Cent | SiO₂ g. p. l. |
| 1227 | 114 | 26.8 | 36.6 | 0.7 | 160 | 212 | 6 | 0 | .055 |
|  |  |  |  |  |  | 212 | 22.5 | 0 | .052 |
| 1301 | 103 | 22 | 36 | 0.7 | 40 | 212 | 19.75 | 1.5 | .057 |
| 1275 | 142 | 22 | 41 | 0.7 | 40 | 212 | 16 | 0 | .068 |
| 1277 | 158 | 23 | 48 | 0.7 | 40 | 212 | 16 | 0 | .073 |
| 1251 | 103 | 22 | 36 | 0.7 | 40 | 176 | 16 | 0 | .089 |
|  |  |  |  |  |  | 176 | 40.5 | 1 | .081 |
| 1315 | 100 | 20 | 36 | 0.7 | 40+150 Na₂SO₄ | 212 | 4.5 | 0 | .051 |
|  |  |  |  |  |  | 212 | 21 | 0 | .036 |
| 1327A | 151 | 12 | 43 | 0.7 | 40+150 Na₂SO₄ | 212 | 2 | 0 | .044 |
| 1328 | 151 | 16 | 43 | 0.7 | 40+150 Na₂SO₄ | 212 | 3 | 0 | .063 |
|  |  |  |  |  |  | 212 | 19 | 2 | .055 |

After obtaining a pregnant solution having the desired alumina content as set forth above, the solution is passed to the desilication operation. It has been discovered that desilication of the leaching solution may be accomplished at normal atmospheric pressures and at temperatures below boiling, by carefully controlling the amount of solids in the leaching solution, composed primarily of sodium aluminum silicate compound or compounds, commonly referred to as "white mud" slurry. The preferred method comprises heating the leaching solution to a temperature below the boiling point thereof in the presence of the alkali metal silicate compounds, with agitation. The heating temperature may range between the lower limit of 185° F. to just below the boiling point of the leaching liquor, which may vary slightly in accordance with the dissolved contents thereof, generally about 217° F. or between 215° F. and 220° F. The preferred range of treatment is from 208° F. to 212° F. However, good desilication results may be obtained in the temperature range of 185° F. to 212° F. As the lower limit is approached, however, the time required to attain low silica values, as well as the tendency for alumina precipitation, increases and while desilication may be accomplished at temperatures below 185° F. the time required to accomplish good results would be impractical.

As a specific example of the desilication step of the invention, a pregnant solution of aluminate containing for example 100 grams per liter of sodium expressed as Na₂CO₃ of which 20 grams per liter is expressed as free caustic, 36 grams per liter of alumina and 0.7 grams per liter of silica is heated in an agitator at a temperature of 212° F. in contact with 4% solids composed of sodium aluminum silicate compound. The agitator may be covered and insulated to preserve and stabilize heat values. The silica content of The precipitated silicate product or white mud consistently runs approximately 33.2% SiO₂; 33% Al₂O₃; 4% SO₄; 22–23% Na₂O and 7.5% ignition loss. This material may be described as a crystalline material, the chief phase of which has a refractive index of 1.48 and may be identified as noselite, one of the members of the sodalite group of minerals which contains sulphate (SO₄). Minerals of this type may broadly be characterized as zeolites, which from X-ray examination and other chemical evidence, are considered to have an open basket structure. This is an important desilication feature because sulphate, originating from sulphur in the fuel used to sinter the limestone-clay mixture becomes dissolved in the leaching circuit. Sulphate would eventually reach a concentration sufficiently high to cause trouble except that it is removed from the circuit along with the residue and, in combination with the white mud sulphate containing minerals. Since sulphate appears to take part in desilication, it is important to note that increased concentrations of sulphate up to 150 or 200 g. p. l., whether added intentionally or allowed to accumulate, result in improved desilication over that obtainable with white mud alone. Laboratory tests have shown that extraction of alumina is not diminished when as much as 150 g. p. l. Na₂SO₄ is present in the leach solution. Desilication tests show that a concentration of 150 g. p. l. Na₂SO₄ in addition to 40 g. p. l. white mud lowers the concentration of SiO₂ in the desilicated solution from 0.057 g. p. l. to 0.036 g. p. l., see test numbers 1301 and 1315.

It has been found that the pregnant solution obtained by leaching the sinter contains about 7.8 grams per liter of SO₄ equivalent to 11.5 grams per liter of Na₂SO₄. In this connection it will be noted that the precipitate resulting from the desilicating treatment contains a portion of Na₂SO₄, and it is believed that the success of the desilication treatment of the present invention may be due at least partly to the presence of $Na_2SO_4$ in the pregnant solution and in the precipitating seed solids.

In carrying out the desilication operation, substantial economies are effected if the precipitated "white mud" or sodium aluminum silicate settled from one batch of solution is employed as seed in treating or desilicating further series of solutions. The efficiency of desilication and length of time required improves considerably as the percentage of "white mud" solids is increased in the pregnant liquor. In actual operation, the solids in the desilication circuit build up to a point where part of the solids must be drawn off in order to maintain the essential fluidity of the mixture. These excess solids may be returned to the raw mix for recovery of the alumina content, or deposited to waste.

In the high pressure desilication technique used in past plant operation it was noted that very much better results were obtained by external heating, with no ebullition of the solution than by heating with internal injection of steam and blowdown of the heated solution. Silica values for the former system were of the order of 0.07 grams per liter against values of the order of 0.12 to 0.14 for the latter when treating solutions of similar concentration. With the low temperature technique, at atmospheric pressure, it has been experimentally shown that when the solution and suspended solids are permitted to boil and the vapors to reflux, the silica value obtainable is generally higher, (0.073 grams per liter against 0.057 grams per liter), than when heating is carried out at a temperature below the boiling point as seen from a comparison of test numbers 1293, 1301 and 1368 in the table. As an operating procedure, agitation at temperatures below the boiling point is much more economic than actually boiling the solutions. For each pound of water boiled off, whether it be allowed to escape or refluxed back into the system, there is lost a quantity of heat equal to the heat of vaporization of water. This heat loss is avoided by agitation in covered tanks at temperatures below the boiling point.

In accordance with the foregoing procedure, the silica content of the solution can be reduced below 0.05 grams of $SiO_2$ per liter of solution. By regulated carbonation, this provides an alumina end product having a silica content of 0.05% or less which is within the commercial requirements for alumina to be employed in metal manufacture.

After desilication, the solution is treated for the recovery of alumina by precipitation of aluminum hydrate. This may be accomplished by carbonation of the solution with carbon dioxide gas, recovered from the kiln gases, which reduces the free alkali hydroxide concentration in the solution so that seeding out of the alumina in accordance with known methods may proceed. With this method, it is possible to obtain 80-90% removal of alumina and still leave the greater part of the silica in solution. Carbonation must be carefully controlled in order to retain the unremoved silica in solution, which is accomplished by maintaining the free sodium hydroxide solution at approximately 20 grams per liter. If carried below this concentration of alkali towards the end point of precipitation, aluminum hydrate precipitates in a finely divided state carrying silica with it.

After precipitation of the aluminum hydrate is carried to the desired end point, somewhat short of complete removal, the barren solution may be returned to the leaching cycle, for reuse.

While the present invention has been described in connection with specific embodiments thereof for purposes of fully explaining the operative details, the scope of the invention is not to be limited thereby save as defined in the appended claims.

I claim:

1. A method of removing silica from a sodium aluminate solution produced from a siliceous aluminous material comprising heating the solution while agitating to a temperature ranging from about 185° F. to a temperature short of the boiling point of the solution in the presence of about 4% of solids composed of zeolite-type sodium aluminum silicate compound developed from the sodium aluminate solution itself by the addition of alkali metal sulphase until there are approximately 50-200 g. p. l. of said sulphate.

2. A method of removing silica from a sodium aluminate solution produced from a siliceous aluminous material comprising heating the solution while agitating to a temperature ranging from about 185° F. to a temperature short of the boiling point of the solution in the presence of about 4% of solids composed of zeolite-type sodium aluminum silicate compound developed from the sodium aluminate solution itself by the addition of sodium sulfate until there are approximately 50 to 200 g. p. l. of sodium sulphate.

3. A method of removing silica from an alkali metal aluminate solution comprising heating the solution to a temperature ranging from about 185° F. to a temperature just short of the boiling point of the solution in the presence of seeds of zeolite-type sodium aluminum silicate compounds developed from the sodium aluminate solution itself by adding alkali metal sulphate until there are approximately 50-200 g. p. l. of said sulfate, separating from the heated solution solids precipitated and bringing a portion of the separated solids into contact with untreated alkali metal aluminate solution for seeding the same.

4. A method of removing silica from a sodium aluminate solution produced from a siliceous aluminous material comprising heating the solution while agitating to a temperature ranging from about 185° F. to a temperature short of the boiling point of the solution in the presence of about 4% of solids composed of zeolite-type sodium aluminum silicate compound developed from the sodium aluminate solution itself by adding an alkali metal sulphate until there are approximately 50-200 g. p. l. of sulfate, said heating lasting for a period of 4 to 20 hours.

5. A method of removing silica from an alkali metal aluminate solution comprising heating the solution to a temperature below the boiling point in the presence of about 4% of solids composed of a zeolite-type alkali metal aluminum silicate compound developed from the sodium aluminate solution itself by adding an alkali metal sulphate compound until there are 50 to 200 g. p. l. of said sulphate compound, said solution being heated for a period of 4 to 20 hours, separating from the heated solution the solids precipitated and bringing a portion of the separated solids into contact with untreated alkali metal aluminate solution for seeding the same.

6. In the extraction of alumina from aluminous material in which a decrepitated sinter composed of dicalcium silicate and calcium aluminate is leached with an alkali metal carbonate solution, the step of removing particles of a size greater than about 5 to 44 microns from the sinter immediately prior to leaching the material, heating the solution to a temperature below the boiling point in the presence of about 4% of solids composed of an alkali metal aluminum silicate compound and in the presence of an alkali metal sulphate compound added to the aluminate solution until a total of 50 to 200 g. p. l. of alkali metal sulphate is reached.

7. In the extraction of alumina from aluminous material in which a decrepitated sinter composed of dicalcium silicate and calcium aluminate is leached with an alkali metal carbonate solution, the step of removing particles of a size greater than about 5 to 44 microns from the sinter immediately prior to leaching the material, heating the solution while agitating to a temperature ranging from about 185° F. to a temperature short of the boiling point of the solution in the presence of about 4% of solids composed of zeolite-type sodium aluminum silicate compound developed from the sodium aluminate solution itself by the addition of alkali metal sulphate.

8. In the extraction of alumina from aluminous material in which a decrepitated sinter composed of dicalcium silicate and calcium aluminate is leached with an alkali metal carbonate solution, the step of removing particles of a size greater than about 5 to 44 microns from the sinter immediately prior to leaching the material, heating the solution to a temperature below the boiling point in the presence of about 4% of solids composed of a zeolite-type alkali metal aluminum silicate compound developed from the sodium aluminate solution itself by adding an alkali metal sulphate compound until there are 50 to 200 g. p. l. of said sulphate compound, and resintering the oversize particles.

9. In the extraction of alumina from aluminous material in which a decrepitated sinter composed of dicalcium silicate and calcium aluminate is leached with an alkali metal carbonate solution, the step of removing particles of a size greater than about 5 to 44 microns from the sinter immediately prior to leaching the material, heating the solution to a temperature below the boiling point in the presence of about 4% of solids composed of a noselite developed from the sodium aluminate solution itself by adding an alkali metal sulphate compound until there are 50 to 200 g. p. l. of said sulphate compound.

FREDERICK RATCLIFFE ARCHIBALD.

REFERENCES CITED

The following references are of record in the file of this patent:

UNITED STATES PATENTS

| Number | Name | Date |
|---|---|---|
| 513,521 | McDonald | Jan. 30, 1894 |
| 1,079,589 | Bassett | Nov. 25, 1913 |
| 1,410,642 | Bassett | Mar. 28, 1922 |
| 2,141,132 | Folger | Dec. 20, 1938 |
| 2,242,258 | Noll | May 20, 1941 |
| 2,420,852 | Archibald | May 20, 1947 |
| 2,421,918 | Anderson et al. | June 10, 1947 |
| 2,434,389 | Breth et al. | Jan. 13, 1948 |
| 2,440,378 | Newsome et al. | Apr. 27, 1948 |
| 2,442,226 | Wall | May 25, 1948 |

FOREIGN PATENTS

| Number | Country | Date |
|---|---|---|
| 552,583 | Great Britain | Apr. 15, 1943 |